July 24, 1923.
R. SCHMITZ
BRAKE
Filed June 8, 1920
1,462,722
2 Sheets-Sheet 1
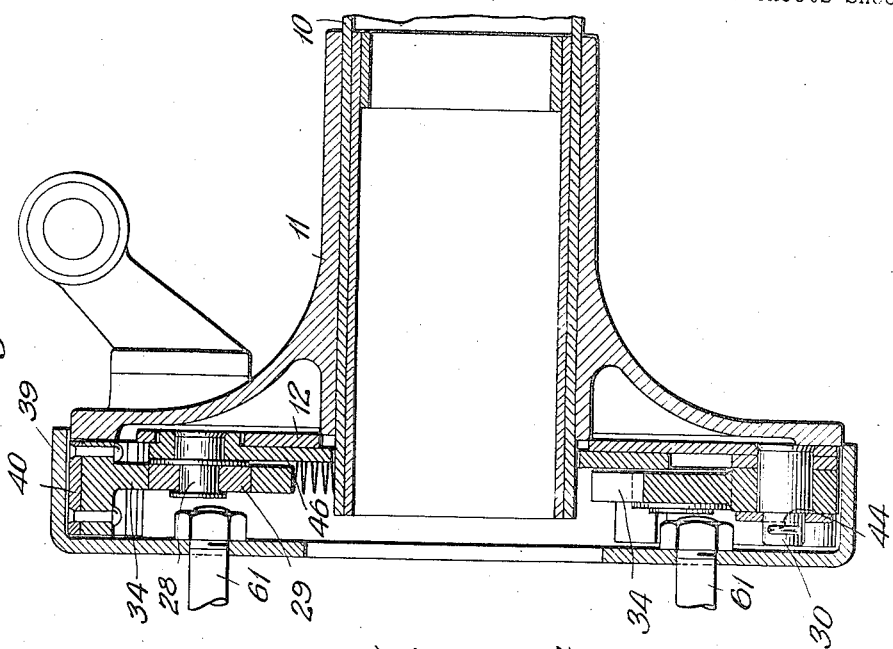

July 24, 1923.
R. SCHMITZ
BRAKE
Filed June 8, 1920
1,462,722
2 Sheets-Sheet 2
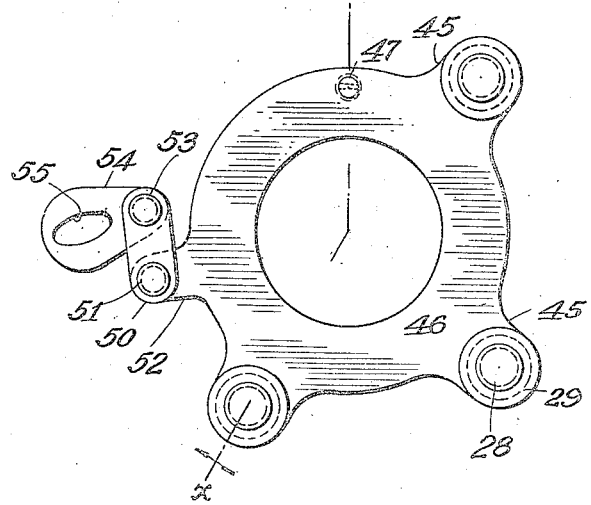
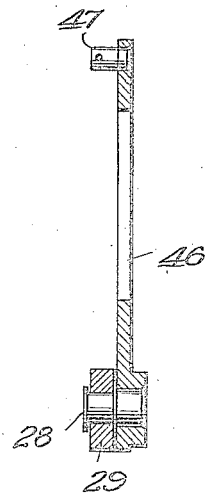
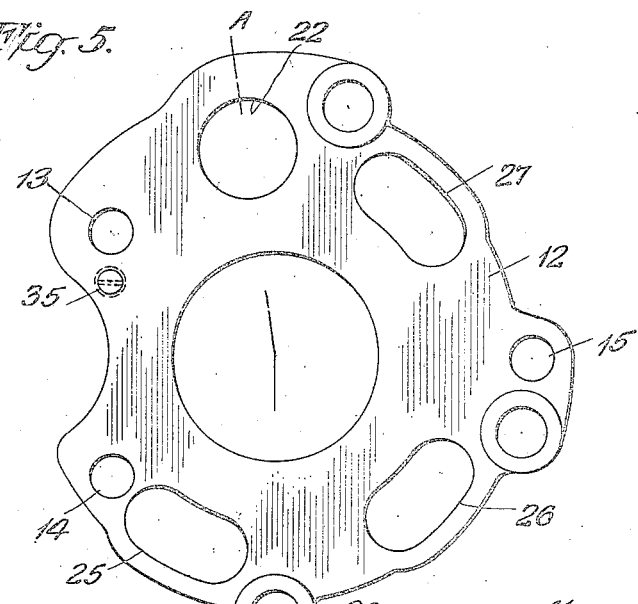
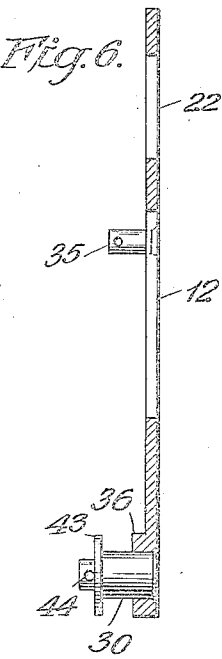
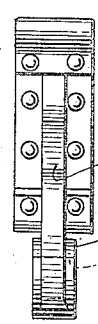
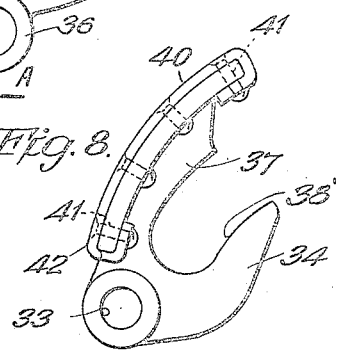
INVENTOR
Richard Schmitz
BY
Dodson & Roe
ATTORNEYS Patented July 24, 1923.

1,462,722

UNITED STATES PATENT OFFICE.

RICHARD SCHMITZ, OF CHICAGO, ILLINOIS, ASSIGNOR TO FERDINAND P. ARM-BRUSTER AND RICHARD SCHMITZ, TRUSTEES, OF CHICAGO, ILLINOIS.

BRAKE.

Application filed June 8, 1920. Serial No. 387,358.

*To all whom it may concern:*

Be it known that I, RICHARD SCHMITZ, a citizen of the United States, residing at Chicago, in the county of Cook and State of Illinois, have invented a certain new and useful Improvement in Brakes, of which the following is a specification.

My invention relates to that class of brakes which are described in my Patent, #1,344,598 and has for its object to provide a brake of this type with certain modifications which will enable it to be used for replacements rather than to be constructed for original installation and which will be peculiarly advantageous for this purpose due to the ability of the construction to adapt itself to a brake drum which is not truly concentric.

My means of accomplishing the foregoing objects may be more readily understood by having reference to the accompanying drawings which are hereunto annexed and are a part of this specification, in which—

Fig. 1 is a side elevation of a brake drum equipped with my improved device.

Fig. 2 is a vertical cross-section of the same.

Fig. 3 is a detail view of the roll-carrying spider.

Fig. 4 is a sectional view of the line $x$—$x$ in Fig. 3.

Fig. 5 is a detail view side elevation of the supporting plate.

Fig. 6 is a section of the line $a$—$a$ of the Fig. 5.

Figs. 7 and 8 are detail views of one of the brake shoes.

Similar reference numerals refer to similar parts throughout the entire description.

As shown in the drawings, 10 is the end of the axle housing, a fragmentary portion only, of it being shown. Mounted upon the housing is a casting 11 to which is secured a supporting plate 12 which is constructed as clearly shown in Fig. 5 and 6 and is provided with a plurality of bolt holes 13, 14 and 15 in which are mounted bolts 16, 17 and 18 upon which are screwed nuts 19, 20 and 21, these nuts serving to clamp the supporting plate fixedly in position and against rotation.

A large opening 22 is provided to clear a nut 24 which is part of the standard equipment of an automobile. A plurality of clearance slots 25, 26 and 27 are provided to allow for the free movement of the washers on the inner ends of the shoulder 28 which carry the rollers 29 as will be hereinafter described.

A plurality of pivot pins 30, 31 and 32 are mounted in the supporting plate and are fitted to openings 33 formed in the brake shoes 34. A pin 35 is fixedly mounted in the supporting plate 12, the purpose of which will be hereinafter described.

In mounting this pin it is desirable to counter-sink and rivet the pin over and then grind it flat. The same construction is desirable for the pivot pins 30, 31 and 32. In the latter case, however, washers 36 are provided and are welded to the supporting plate 12.

It will be obvious from the foregoing description that this plate can be stamped of sheet steel, and that by welding the washers 36 in position, that ample strength is afforded for the support of the pivot pins which carry the brake shoes 34.

The brake shoes 34 are constructed as more clearly seen in Figs. 7 and 8 with an opening 33 to which is fitted the pivot pins 30, 31 and 32 upon which the brake shoes 34 are adapted to swing. These shoes are provided with a web 37 which has a U-shaped opening 38 formed in it, the walls of which are finished and are fitted to the diameter of the rollers 29 so that they can roll freely therein. The web 37 is also provided with two laterally extending flanges which are formed on the segment of a circle, the radius of which corresponds to the radius of the inner surface of the brake drum 39. To this surface is riveted a suitable brake lining 40 of asbestos or any of the standard materials employed for this purpose. The lining can be very conveniently secured by means of rivets 41 as shown in Fig. 8, the lining being folded over the ends of the arcuate surface 42 of the brake shoe 1.

These shoes are suitably held upon the pivot pins by means of washers 43 which may be secured by means of cotter pins 44 or in any other suitable or convenient manner. The rollers 29 are carried by the shouldered pins 28 which are mounted in radially extending lugs 45 formed on a rotatable spider 46. This spider is mounted in spaced relation to the axle so that it can become eccentric thereto in the event the brake drum is not concentric with the axle. A pin 47 is fixedly secured to the spider to which is attached one end of a coil spring 48, the other end being attached to the pin 35 on the apertured plate 12. Means for rotating the spider are provided by means of a link 49, one end 50 of which is secured to a pin or pivot 51 mounted in a radially projecting lug 52 on the spider 46. The other end of the link is secured to a pin 53 mounted in one end of a lever 54. This lever which is preferably mounted for oscillation in a bearing formed in the axle housing, is provided with an elongated slot 55 in which is mounted a laterally extending lug 56 formed on one end of an arm 57, so that when the two are engaged, the arm 57 and lever 54 form a bell crank lever, the rocking of which serves to rotate the spider about its axis. The arm 57 is suitably secured to the brake rod 58, this arm 57 and the brake rod being the standard parts of the machine upon which the brake is designed to be used as a replacement.

The operation of the device is as follows:

The coil spring 48 holds the brake lining normally out of engagement with the inner surface of the brake drum 39 which is suitably secured by means of bolts 61 to the wheel (not shown). When the brake rod 58 is advanced, the bell crank lever causes the link 49 to rotate the spider 46 about its axis. This in turn causes the rollers 29 to engage the outer surface of the U-shaped slot 38, swinging the brake shoes upon their pivot pins and causing the brake lining to engage the inner surface of the brake drum 39.

It will be obvious from the foregoing, that if the surface to be gripped is not concentric with the axis of the axle, that instead of one shoe engaging it, the result will be that the position of the spider 46 will be shifted until it assumes the same degree of eccentricity as that of the surface to be gripped in which position all of the shoes will engage said surface. Upon releasing the brake rod 58 the coil spring 48 returns the shoes to their normal position.

Having described my invention what I regard as new and desire to secure by Letters Patent is:

1. A brake comprising the combination with a brake drum, of an apertured plate, the apertures being located to clear the standard fastenings, means to hold said plate against rotation, a plurality of pivot pins fixedly mounted in said plate, a plurality of brake shoes pivoted on said pins, having arcuate slots therein and friction engaging surfaces to engage the inner surface of the brake drum, a rotatable spider in spaced relation to the axle, pins carried by said spider, a plurality of rollers on said pins which engage the slots in the brake shoes, a link one end of which is pivotally secured to said spider, a lever to which the other end is secured, a bearing in which said lever oscillates, a brake rod, an arm secured thereto, the other end of which is provided with a laterally extending portion which is fitted to and engages with an elongated slot in the said oscillating lever whereby when the brake rod is moved, the spider is rotated and the rollers cause the brake shoes to engage the brake drum.

2. A brake comprising the combination with a brake drum, of an apertured plate, the apertures being located to clear the standard fastenings, means to hold said plate against rotation, a plurality of pivot pins fixedly mounted in said plate, a plurality of brake shoes pivoted on said pins, having arcuate slots therein and friction engaging surfaces to engage the inner surface of the brake drum, a rotatable spider so mounted as to be capable of eccentric movement, pins carried by said spider, a plurality of rollers on said pins which engage the slots in the brake shoes, a link one end of which is pivotally secured to said spider, a lever to which the other end is secured, a bearing in which said lever oscillates, a brake rod, an arm secured thereto, the other end of which is provided with a laterally extending portion which is fitted to and engages with an elongated slot in the said oscillating lever whereby when the brake rod is moved, the spider is rotated and the rollers cause the brake shoes to engage the brake drum, means to hold brake shoes normally out of engagement with the brake drum.

3. A brake comprising the combination with a brake drum, of an apertured plate, the apertures being located to clear the standard fastenings, means to hold said plate against rotation, a plurality of pivot pins fixedly mounted in said plate, a plurality of brake shoes pivoted on said pins, having arcuate slots therein and friction engaging surfaces to engage the inner surface of the brake drum, a rotatable spider, pins carried by said spider, a plurality of rollers on said pins which engage the slots in the brake shoes, a link one end of which is pivotally secured to said spider, a lever to which the other end is secured, a bearing in which said lever oscillates, a brake rod, an arm secured thereto, the other end of which is provided with a laterally extending portion which is fitted to and engages with an elongated slot in the said oscillating lever whereby when the brake rod is moved, the spider is rotated and the rollers cause the brake shoes to engage the brake drum, a coil spring, one end of which is secured to the spider, the other to the plate, which spring holds the shoes normally out of engagement with the drum.

In testimony whereof I have signed the foregoing specification.

RICHARD SCHMITZ.